United States Patent
Yamashita et al.

(10) Patent No.: US 9,628,324 B2
(45) Date of Patent: Apr. 18, 2017

(54) OPENFLOW SWITCH AND FAILURE RECOVERY METHOD IN OPENFLOW NETWORK

(71) Applicant: FUJITSU LIMITED, Kawasaki-shi, Kanagawa (JP)

(72) Inventors: Shinji Yamashita, Kawasaki (JP); Akiko Yamada, Kawasaki (JP); Toshio Soumiya, Yokohama (JP); Sho Shimizu, San Jose, CA (US); Keiichi Nakatsugawa, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 95 days.

(21) Appl. No.: 14/665,564

(22) Filed: Mar. 23, 2015

(65) Prior Publication Data

US 2015/0295752 A1    Oct. 15, 2015

(30) Foreign Application Priority Data

Apr. 14, 2014 (JP) ................................. 2014-083141

(51) Int. Cl.
  *H04L 12/703* (2013.01)
  *H04L 12/24* (2006.01)

(52) U.S. Cl.
  CPC .............................. *H04L 41/0654* (2013.01)

(58) Field of Classification Search
  CPC ........................... H04L 41/0654; H04L 45/22
  See application file for complete search history.

(56) References Cited

U.S. PATENT DOCUMENTS

| 8,953,432 | B2* | 2/2015 | Ansari | H04L 45/02 370/216 |
| 2008/0056159 | A1* | 3/2008 | Suzuki | H04L 45/00 370/254 |
| 2012/0044813 | A1* | 2/2012 | Nandagopal | H04L 45/28 370/242 |
| 2012/0201140 | A1* | 8/2012 | Suzuki | H04L 45/22 370/235 |
| 2013/0028142 | A1* | 1/2013 | Beheshti-Zavareh | H04L 45/22 370/255 |
| 2013/0077481 | A1 | 3/2013 | Philavong et al. | |
| 2013/0194914 | A1* | 8/2013 | Agarwal | H04L 45/245 370/225 |
| 2013/0215769 | A1* | 8/2013 | Beheshti-Zavareh | H04L 45/64 370/252 |

(Continued)

FOREIGN PATENT DOCUMENTS

| JP | 2011-146982 | 7/2011 |
| JP | 2011-160363 | 8/2011 |

(Continued)

*Primary Examiner* — Scott M Sciacca
(74) *Attorney, Agent, or Firm* — Fujitsu Patent Center

(57) ABSTRACT

An OpenFlow switch used in an OpenFlow network including a plurality of OpenFlow switches and an OpenFlow controller configured to control the plurality of OpenFlow switches includes: a failure detector configured to detect a failure of a link connected to the OpenFlow controller; and a channel management unit configured to establish an OpenFlow channel to transmit control information to the OpenFlow controller through another OpenFlow switch among the plurality of OpenFlow switches when a failure is detected by the failure detector.

9 Claims, 16 Drawing Sheets

(56) References Cited

U.S. PATENT DOCUMENTS

| | | | | |
|---|---|---|---|---|
| 2014/0207923 A1* | 7/2014 | Jokinen | ............... | H04L 41/0813 709/221 |
| 2014/0269288 A1* | 9/2014 | Crisan | ................. | H04L 47/2425 370/231 |
| 2015/0200803 A1* | 7/2015 | Kashyap | ............. | H04L 41/0659 370/217 |
| 2015/0372902 A1* | 12/2015 | Giorgetti | ................. | H04L 45/64 370/219 |

FOREIGN PATENT DOCUMENTS

| | | |
|---|---|---|
| JP | 2011-166384 | 8/2011 |
| JP | 2012-49674 | 3/2012 |
| JP | 2013-211706 | 10/2013 |
| WO | 2011-083785 | 7/2011 |

* cited by examiner

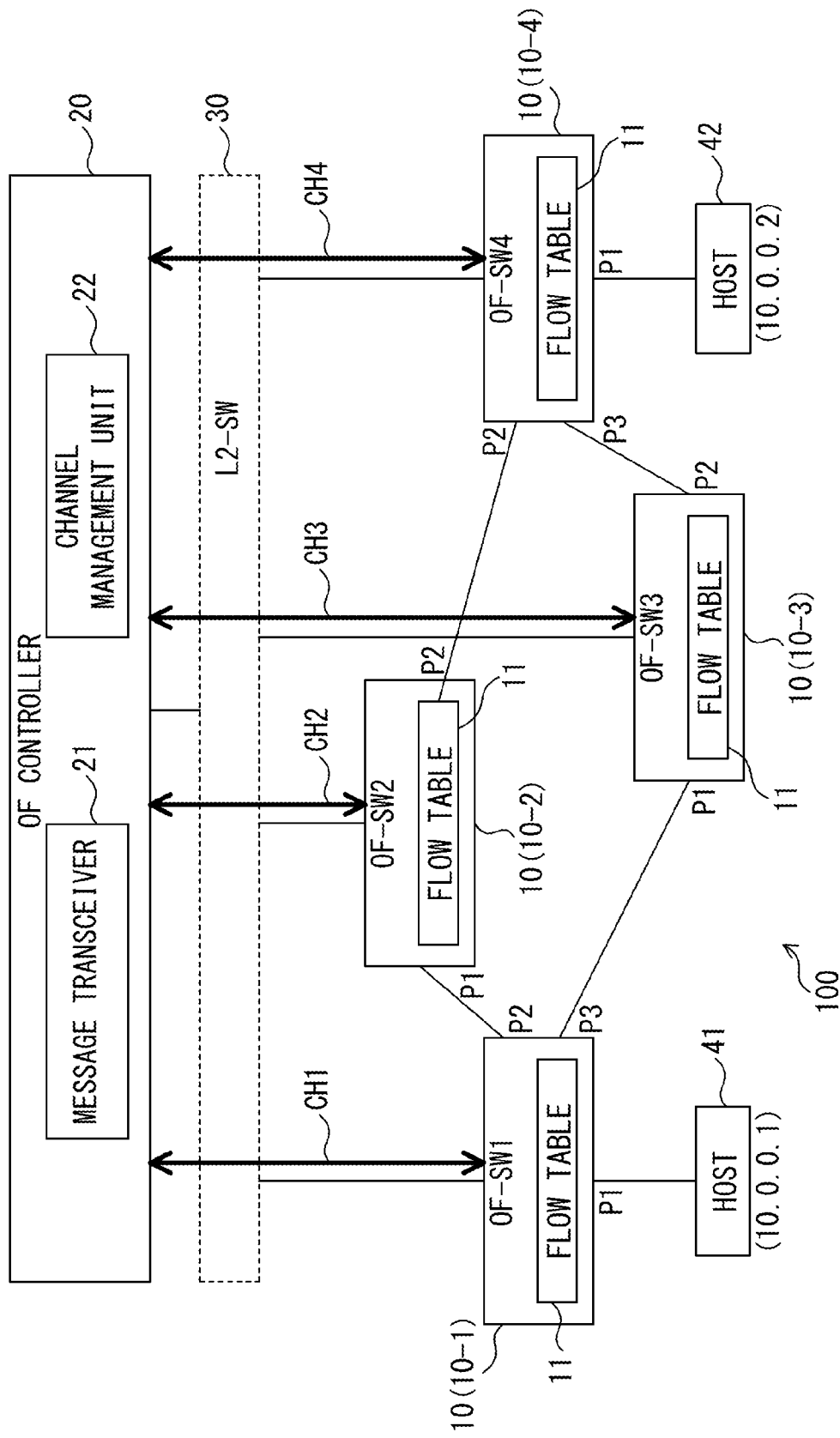
F I G. 1

FLOW TABLE OF OF-SW1

| MATCHING CONDITION | ACTION | STATISTICS |
|---|---|---|
| IP Src = 10.0.0.1(HOST41) | Output = p2 | 1000byte |
| IP Src = 10.0.0.2(HOST42) | Output = p1 | 500byte |

FLOW TABLE OF OF-SW2

| MATCHING CONDITION | ACTION | STATISTICS |
|---|---|---|
| IP Src = 10.0.0.1(HOST41) | Output = p2 | 1000byte |
| IP Src = 10.0.0.2(HOST42) | Output = p1 | 500byte |

FLOW TABLE OF OF-SW3

| MATCHING CONDITION | ACTION | STATISTICS |
|---|---|---|
| IP Src = 10.0.0.3 | Output = p2 | 500byte |
| IP Src = 10.0.0.4 | Output = p1 | 500byte |

FLOW TABLE OF OF-SW4

| MATCHING CONDITION | ACTION | STATISTICS |
|---|---|---|
| IP Src = 10.0.0.1(HOST41) | Output = p1 | 1000byte |
| IP Src = 10.0.0.2(HOST42) | Output = p2 | 500byte |

F I G. 2

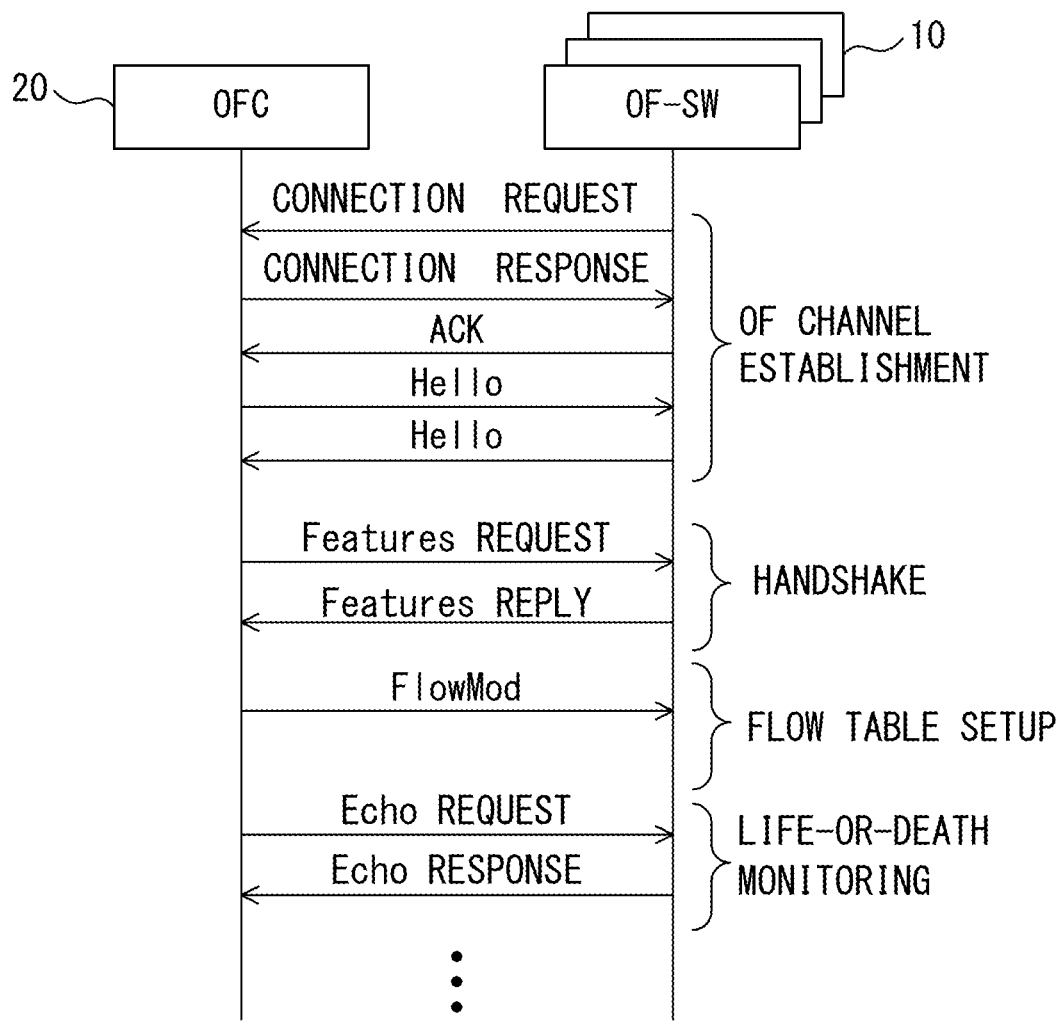
F I G. 3

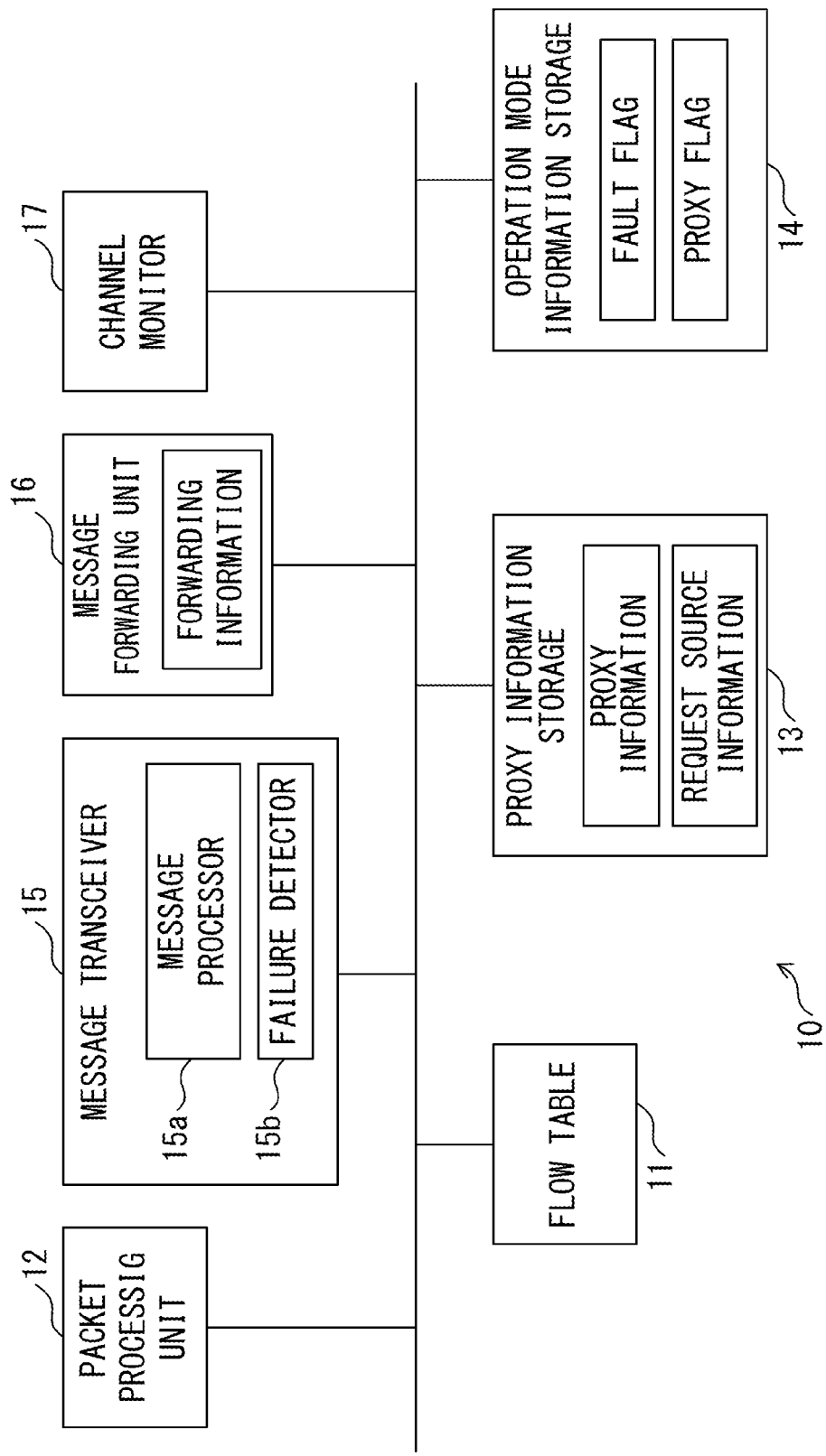
F I G. 5

| SWITCH ID | PROXY  | FAILURE |
|-----------|--------|---------|
| OF-SW1    | OF-SW2 | 1       |
| OF-SW2    | OF-SW4 | 0       |
| OF-SW3    | OF-SW1 | 0       |
| OF-SW4    | OF-SW3 | 0       |

FIG. 6

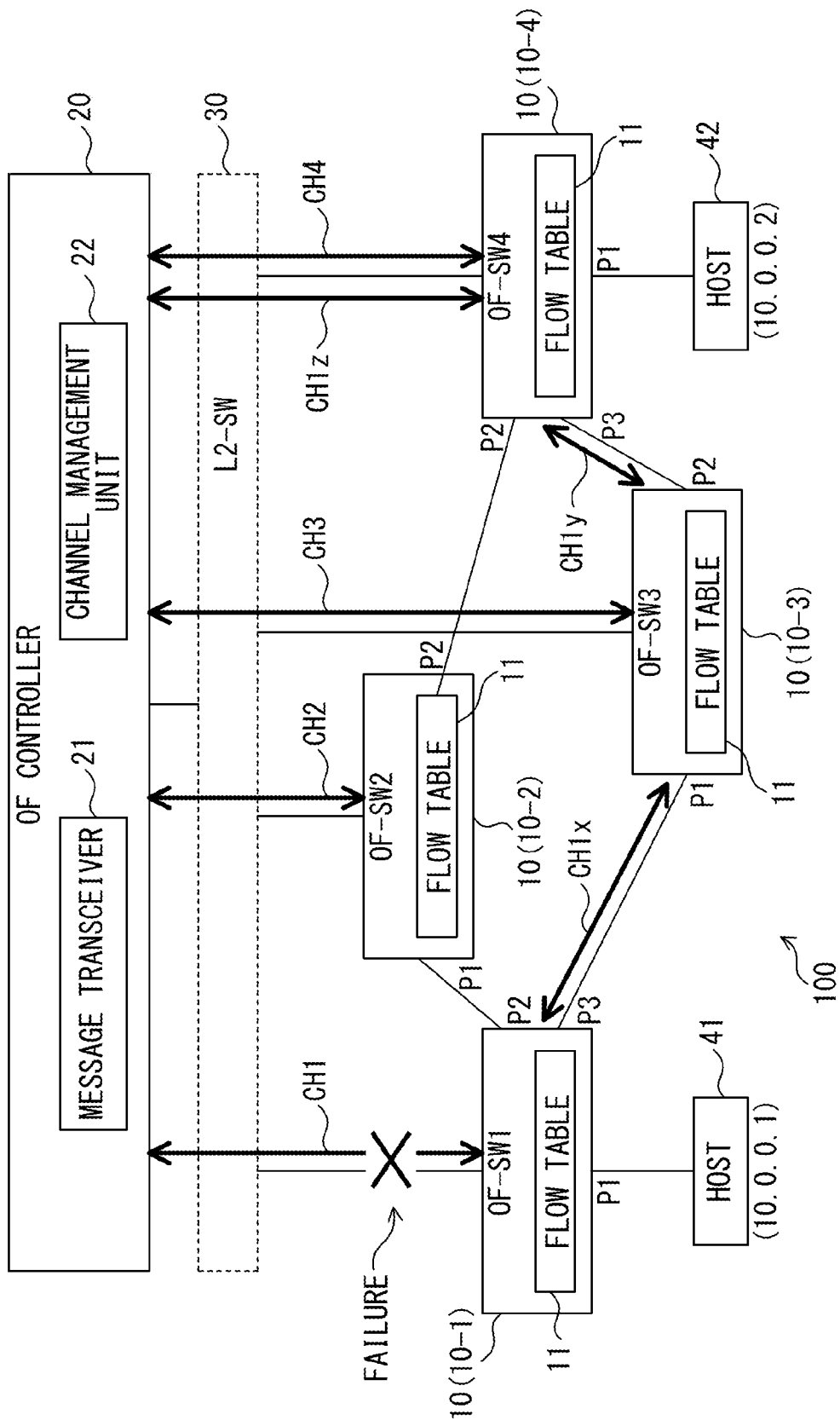
F I G. 9

FLOW TABLE OF OF-SW2

| MATCHING CONDITION | ACTION | STATISTICS |
|---|---|---|
| IP Src = 10.0.0.1 | Output = p2 | 1000byte |
| IP Src = 10.0.0.2 | Output = p1 | 500byte |
| ⋮ | ⋮ | ⋮ |
| | | TOTAL : 5000byte |

FLOW TABLE OF OF-SW3

| MATCHING CONDITION | ACTION | STATISTICS |
|---|---|---|
| IP Src = 10.0.0.3 | Output = p2 | 500byte |
| IP Src = 10.0.0.4 | Output = p1 | 500byte |
| ⋮ | ⋮ | ⋮ |
| | | TOTAL : 3000byte |

FLOW TABLE OF OF-SW4

| MATCHING CONDITION | ACTION | STATISTICS |
|---|---|---|
| IP Src = 10.0.0.1 | Output = p1 | 1000byte |
| IP Src = 10.0.0.2 | Output = p2 | 500byte |
| ⋮ | ⋮ | ⋮ |
| | | TOTAL : 6000byte |

FIG. 12

OPENFLOW SWITCH AND FAILURE RECOVERY METHOD IN OPENFLOW NETWORK

CROSS-REFERENCE TO RELATED APPLICATION

This application is based upon and claims the benefit of priority of the prior Japanese Patent Application No. 2014-083141, filed on Apr. 14, 2014, the entire contents of which are incorporated herein by reference.

FIELD

The embodiments discussed herein are related to an OpenFlow switch used in an OpenFlow network and a failure recovery method in the OpenFlow network.

BACKGROUND

Research on and development of Software Defined Networking (SDN) is being advanced. SDN controls the behavior of the entire network using software. OpenFlow networks have been attracting attention as one of the technologies for achieving the SDN. The OpenFlow network is configured to include an OpenFlow controller (OF controller or OFC) and a plurality of OpenFlow switches (OF switch or OF-SW).

Each OpenFlow switch has a flow table. The flow table is configured to include one or more flow entries. In each flow entry, an operation for the corresponding flow is described. Specifically, each flow entry includes "matching condition", "action", and so on. The matching condition is equivalent to the identification information for identifying a flow to which a received packet belongs. The action describes the operation for the received packet in which the matching condition is met. Then, the OpenFlow switch searches the matching conditions in the flow table using the header information of the received packet and executes the corresponding action.

The OpenFlow controller manages the flow table of each OpenFlow switch. Also, the OpenFlow controller can update the contents of the flow table for each OpenFlow switch.

At the time of starting up the OpenFlow network, OpenFlow channels are established respectively between the OpenFlow controller and each OpenFlow switch. Then, messages are transmitted between the OpenFlow controller and each OpenFlow switch through the respective OpenFlow channels, and a flow table is configured for each OpenFlow switch. Thus, packet transfer can be achieved under the control of the OpenFlow controller. When the operation of the network is changed, the OpenFlow controller transmits a message that contains necessary information and an instruction to the corresponding OpenFlow switch through the OpenFlow channel. Then, the OpenFlow switch updates the flow table in response to the received message.

As described, each OpenFlow switch creates a flow table according to a message received from the OpenFlow controller through an OpenFlow channel and forwards a packet using the flow table. Thus, when a failure occurs in the OpenFlow channel that is established between the OpenFlow controller and the OpenFlow switch, the OpenFlow switch may not be able to forward the packet under the control of the OpenFlow controller. Therefore, a configuration or a method for recovering a failure of the OpenFlow channel has been proposed.

For example, a configuration duplicating the physical link between the OpenFlow controller and the OpenFlow switch is proposed. In this case, the OpenFlow channel is established on a work link. Then, when a failure occurs in the work link, an OpenFlow channel is established on a protection link.

A related art is described in WO2011/083785, Japanese Laid-open Patent Publication No. 2011-146982 (Japanese patent No. 5207082), Japanese Laid-open Patent Publication No. 2011-160363, Japanese Laid-open Patent Publication No. 2011-166384, Japanese Laid-open Patent Publication No. 2013-211706, Japanese Laid-open Patent Publication No. 2012-49674.

However, in the configuration where physical links between the OpenFlow controller and the OpenFlow switches are duplicated, the cost for establishing the network increases. Also, the number of physical ports provided for each OpenFlow switch increases.

SUMMARY

According to an aspect of the embodiments, an OpenFlow switch used in an OpenFlow network including a plurality of OpenFlow switches and an OpenFlow controller configured to control the plurality of OpenFlow switches includes: a failure detector configured to detect a failure of a link connected to the OpenFlow controller; and a channel management unit configured to establish an OpenFlow channel to transmit control information to the OpenFlow controller through another OpenFlow switch among the plurality of OpenFlow switches when a failure is detected by the failure detector.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an OpenFlow network.

FIG. 2 illustrates an example of a flow table.

FIG. 3 is a sequence diagram illustrating the start-up procedure of the OpenFlow network.

FIG. 5 illustrates an example of a configuration of an OF switch.

FIG. 6 illustrates an example of a switch management table.

FIG. 9 illustrates a variation of the recovery procedure.

FIG. 12 is a diagram for explaining statistical information on the OF switch.

DESCRIPTION OF EMBODIMENTS

Figure 4:
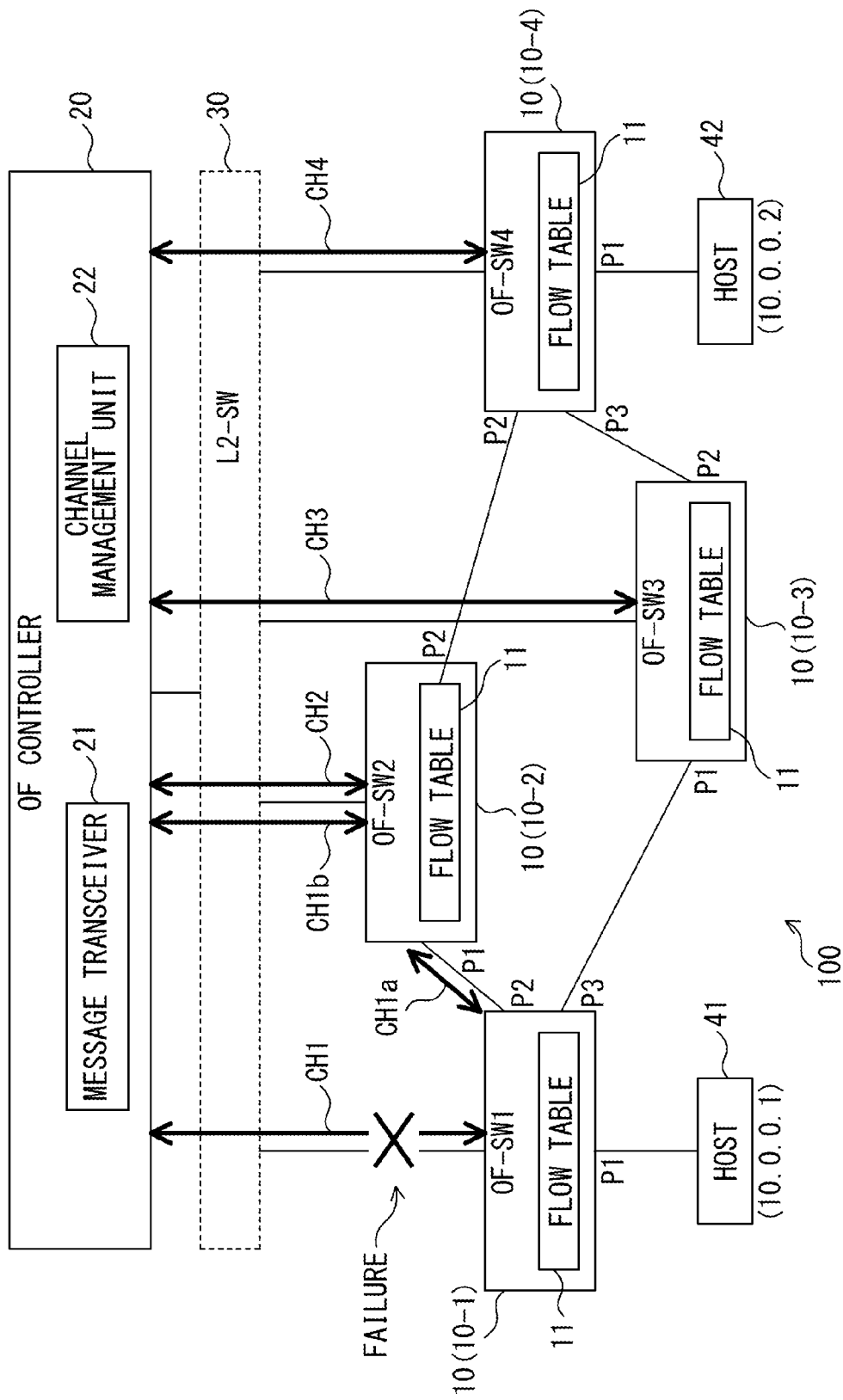
FIG. 4 illustrates an example of a recovery procedure for a link failure.

FIG. 1 illustrates an example of an OpenFlow network according to an embodiment of the present invention. As illustrated in FIG. 1, the OpenFlow network 100 according to the embodiment includes a plurality of OpenFlow switches (OF-SW) 10 and an OpenFlow controller (OFC) 20. In this example, the OpenFlow network 100 has four OpenFlow switches 10 (10-1 through 10-4). In addition, a layer 2 switch (L2-SW) 30 is provided between each OpenFlow switch 10 and the OpenFlow controller 20.

In the following description, the OpenFlow switch may be referred to as the "OF switch". In addition, the OpenFlow controller may be referred to as the "OF controller". Moreover, in the drawing, the OF switches 10-1 through 10-4 are respectively denoted as the "OF-SW1" through "OF-SW4".

The OF switch 10 is connected to another one or more OF switches 10. In the example illustrated in FIG. 1, the OF switch 10-1 is connected to the OF switch 10-2 and the OF switch 10-3. The OF switch 10-2 is connected to the OF switch 10-1 and the OF switch 10-4. The OF switch 10-3 is connected to the OF switch 10-1 and the OF switch 10-4. The OF switch 10-4 is connected to the OF switch 10-2 and the OF switch 10-3. Note that the link between the OF switches 10 is implemented by an optical fiber, for example. Further, a relay node may be provided on the link between the OF switches 10.

A host 41 is accommodated in the OF switch 10-1. A host 42 is accommodated in the OF switch 10-4. In this embodiment, the IP address of the host 41 is "10.0.0.1" and the IP address of the host 42 is "10.0.0.2".

The OF switches 10 are respectively connected to the OF controller 20. In this example, each OF switch 10 is connected to the OF controller 20 through the layer 2 switch 30. Also, dedicated physical links are provided between the respective OF switches 10 and the layer 2 switch 30. However, in the OpenFlow network 100, the layer 2 switch 30 is not an essential device.

The OF switch 10 has a flow table 11. The flow table 11 is configured by one or more flow entries. In each flow entry, an operation for the corresponding flow is described.

FIG. 2 illustrates an example of the flow table 11. In the example illustrated in FIG. 2, each entry in the flow table 11 includes "matching condition" "action" and "statistics". The "matching condition" identifies the flow to which the received packet belongs. In the example illustrated in FIG. 2, the IP address of the source host is stored as the matching condition. The "action" describes an operation for the received packet that meets the matching condition. For example, in the flow table 11 of the OF switch 10-1 (OF-SW1) "action: output the received packet through the port p2" is stored for "matching condition: source IP address: 10.0.0.1". "Statistics" represents the statistical information related to the flow that meets the matching condition. In the example illustrated in FIG. 2, a traffic quantity of the flow (here, the number of bytes of the forwarded packet) passing through the OF switch 10 is stored.

Note that the matching condition of flow table 11 is not limited to the source IP address of the received packet and may be other conditions. That is, any information in the header of the received packet may be used as the matching condition. For example, a port number, a source MAC address, a destination MAC address, a virtual LAN identifier, a source IP address, a destination IP address, or any combination thereof may be used as a matching condition.

The flow table 11 is set up and updated by the OF controller 20. That is, the OF controller 20 can set up and update the flow table 11 of each OF switch 10. For example, in response to a request from a user, the OF controller 20 sets up or updates the flow table 11 of one or more OF switches 10 relating to the request.

Messages are transmitted through respective OpenFlow channels (hereinafter, OF channels) between the OF controller 20 and the OF switches 10. In the example illustrated in FIG. 1, the OF channels CH1, CH2, CH3, and CH4 are respectively established between the controller 20 and the OF switches 10-1, 10-2, 10-3 and 10-4. The OF channel, for example, is achieved by a TCP connection, or is alternatively established on the TCP connection, for example.

FIG. 3 is a sequence diagram illustrating an example of a start-up procedure of the OpenFlow network 100. This sequence is executed between the OF controller 20 and each OF switch 10, respectively.

In a connection establishment process, a connection is established by using TCP or TLS. That is, the OF switch 20 transmits a connection request message to the OF controller 20. The OF controller 20 returns a connection response message to the OF switch 10 for the connection request message. The OF switch 10 transmits an ACK message to the OF controller 20. Thereafter, a Hello message is exchanged between the OF controller 20 and the OF switch 10.

In a handshake process, the OF controller 20 transmits a Features request message to the OF switch 10. The OF switch 10 returns a Features reply message to the OF controller 20 in response to the request message. The Features reply message contains basic information of the OF switch 10. This basic information includes, for example, information identifying the OF switch 10 (DPID: Data Path ID) and information representing the functions that are supported by the OF switch 10.

In a flow table setup process, a FlowMod message is sent from the OF controller 20 to the OF switch 10. The FlowMod message includes information to be stored in the flow table 11. Therefore, the OF controller 20 can set up the flow table 11 of the OF switch 10.

In a life-or-death monitoring process, an Echo request message is sent from the OF controller 20 to the OF switch 10. The OF switch 10 receives the Echo request message and returns an Echo response message to the OF controller 20. This life-or-death monitoring process is executed periodically, for example. Therefore, the OF controller 20 can monitor the failure of a link between the OF controller 20 and the OF switches 10 according to the Echo request/response message. Similarly, the OF switch 10 can monitor the failure of a link between the OF switch 10 and the OF controller 20 according to the Echo request/response message.

Thereafter, the OF controller 20 can, if necessary, transmit the FlowMod message at any time to the OF switch 10. The OF switch 10 may request the OF controller 20 to transmit the FlowMod message. For example, when the header information of the received packet does not meet the matching condition of the flow table 11, the OF switch 10 transmits an inquiry message to the OF controller 20. In this case, the OF controller 20 generates a FlowMod message corresponding to the inquiry message and transmits the FlowMod message to the OF switch 10.

The OF controller 20 includes a message transceiver 21 and a channel management unit 22. The message transceiver 21 transmits OF messages to the OF switches 10 and receives OF messages from the OF switches 10. Note that the OF message is an example of control information that is transmitted between the switches 10 and the OF controller 20. The example of the OF message is explained above with reference to FIG. 3. However, the OF message is not limited to the message illustrated in FIG. 3. The channel management unit 22 manages the OF channels between the OF controller 20 and the OF switches 10.

In the OpenFlow network 100, it is assumed that communication between the host 41 and the host 42 is requested. In this case, the OF controller 20 determines a path that provides communication between the host 41 and the host 42. In this example, it is assumed that the path through the OF switches 10-1, 10-2 and 10-4 is specified. In this case, the OF controller 20 updates the respective flow tables 11 of the OF switches 10-1, 10-2 and 10-4 to the state illustrated in FIG. 2.

The packet that is transmitted from the host 41 to the host 42 is first received by the OF switch 10-1. The OF switch 10-1 transmits the packet through the port p2 by referring to the flow table 11 using the header information of the received packet (here, the source IP address). Therefore, the packet is forwarded to the OF switch 10-2. Similarly, the OF switch 10-2 forwards the packet to the OF switch 10-4. The OF switch 10-4 forwards the packet to the host 42. The host 42 thus receives the packet transmitted from the host 41. Similarly, a packet transmitted from the host 42 is forwarded by the OF switches 10-4, 10-2, and 10-1 to the host 41.

In this way, the OF switch 10 processes the received packet according to the flow table 11. Then, the flow table 11 is set up and updated by the OF controller 20. Thus, when a link failure occurs between the OF controller 20 and the OF switch 10, the OF switch 10 is not able to provide the requested communication service. Therefore, the OpenFlow network 100 has a function to recover the link failure.

First Embodiment

FIG. 4 illustrates an example of a recovery procedure for the link failure between the OF switch 10 and the OF controller 20. In the example illustrated in FIG. 4, a failure has occurred in the link between the OF switch 10-1 and the OF controller 20 (actually, in the link between the OF switch 10-1 and the layer 2 switch 30). As a result, the OF channel CH1 between the OF switch 10-1 and the OF controller 20 is disconnected. In this case, both the OF switch 10-1 and the OF controller 20 respectively detect the failure because of not receiving the Echo request and/or Echo reply.

When the OF switch 10-1 detects the link failure between the OF switch 10-1 and the OF controller 20, the OF switch 10-1 establishes a new TCP connection between the OF switch 10-1 and the proxy OF switch that has been specified in advance. In the example illustrated in FIG. 4, the OF switch 10-2 is the proxy OF switch that has been specified for the OF switch 10-1. In this case, the OF switch 10-1 establishes a new TCP connection between the OF switch 10-1 and the OF switch 10-2. Thus, an OF channel CH1a is established between the OF switch 10-1 and the OF switch 10-2.

The OF switch 10-2 establishes a new TCP connection between the OF switch 10-2 and the OF controller 20 for the OF switch 10-1. Here, the OF controller 20 has detected that a failure has occurred in the link between the OF controller 20 and the OF switch 10-1. Here, it is assumed that the OF controller 20 knows that the OF switch 10-2 is the proxy OF switch of the OF switch 10-1. Under this situation, upon receiving a connection request from the OF switch 10-2, the OF controller 20 permits the request. Thus, the TCP connection is established between the OF switch 10-2 and the OF controller 20 and a channel CH1b is established.

Furthermore, the OF switch 10-2 updates the setting of the message forwarding unit so that the processing operations described below are executed.

(1) When an OF message addressed to the OF controller 20 is received from the OF switch 10-1 through the OF channel CH1a, the OF message is forwarded to the OF controller 20 through the OF channel CH1b.

(2) When an OF message addressed to the OF switch 10-1 is received from the OF controller 20 through the OF channel CH1b, the OF message is forwarded to the OF switch 10-1 through the OF channel CH1a.

Note that the OF channels CH1a and CH1b may be implemented by a virtual LAN, for example. In this case, a virtual LAN identifier that identifies the communication between the OF switch 10-1 and the OF controller 20 has been given in advance to the OF switch 10-1, the OF switch 10-2, and the OF controller 20, for example. Alternatively, in the procedure for setting the OF channels CH1a and CH1b, the above-mentioned virtual LAN identifier may be given to the OF switch 10-1, the OF switch 10-2, and the OF controller 20. In the following description, the virtual LAN identifier may be referred to as the "VID-SW1". When the OF switch 10-1 transmits an OF message to the OF controller 20, the VID-SW1 is added to the OF message. Also, when the OF controller 20 transmits an OF message to the OF switch 10-1, the VID-SW1 is added to the OF message. Furthermore, the OF switch 10-2 updates the setting of the message forwarding unit so that the processing operations described below are executed.

(1) When an OF message to which the VID-SW1 is added is received from the OF switch 10-1 through the OF channel CH1a, the OF message is forwarded to the OF controller 20 through the OF channel CH1b.

(2) When an OF message to which the VID-SW1 is added is received from the OF controller 20 through the OF channel CH1b, the OF message is forwarded to the OF switch 10-1 through the OF channel CH1a.

As described, when a link failure between the OF switch 10-1 and the OF controller 20 is detected, the OF switch 10-1 specifies another OF switch 10 in the OpenFlow network 100 as the proxy OF switch and establishes a new connection between the OF switch 10-1 and the OF controller 20 via the proxy OF switch. In this way, the OF channel between the OF switch 10-1 and the OF controller 20 is restored.

After the OF channel is restored between the OF switch 10-1 and the OF controller 20 through the OF switch 10-2, the OF switch 10-1 transmits an OF message using the OF channel CH1a, and the message is forwarded by the OF switch 10-2 to the OF controller 20. In other words, for the OF switch 10-1, the OF switch 10-2 may be recognized as the OF controller 20. Similarly, when the OF controller 20 transmits an OF message using the OF channel CH1b, the message is forwarded by the OF switch 10-2 to the OF switch 10-1. In other words, for the OF controller 20, the OF switch 10-2 may be recognized as the OF switch 10-1.

Thus, in an OpenFlow network 100, even without providing a protection line between each OF switch 10 and the OF controller 20, it is possible to recover a link failure between each OF switch 10 and the OF controller 20. Therefore, the cost for establishing the OpenFlow network may be reduced. In other words, the recovery of a link failure with low cost configuration can be achieved. Also, since there is no need to provide each OF switch with a port for the protection line, the cost of the OF switch may be reduced.

FIG. 5 illustrates an example of a configuration of the OF switch 10. The OF switch 10, as illustrated in FIG. 5, includes the flow table 11, a packet processing unit 12, a proxy information storage unit 13, an operation mode information storage unit 14, a message transceiver 15, a message forwarding unit 16, and a channel management unit 17. In this example, the OpenFlow network 100 is assumed to transmit packets (or frames). Also, the OF switch 10 may have other components.

The packet processing unit 12 processes a received packet. For example, the packet processing unit 12 searches the flow table 11 according to the header information of the received packet and can determine the action for the packet. When the OF message is stored in the payload of the received packet, the packet processing unit 12 guides the packet to the message transceiver 15 or the message forwarding unit 16.

The proxy information storage unit 13 stores proxy information and requests source information. The proxy information represents another OF switch 10 which operates as the proxy OF switch when a link failure between the OF switch 10 and the OF controller 20 has been detected. For example, in the example illustrated in FIG. 4, "proxy information: OF Switch 10-2" is stored in the proxy information storage unit 13 of the OF switch 10-1. Also, the proxy information may include a virtual LAN identifier for identifying a virtual LAN to which the OF message that is transmitted using the proxy OF switch belongs. The request source information represents another OF switch 10 that requests the OF switch 10 to operate as a proxy OF switch. For example, in the example illustrated in FIG. 4, the OF switch 10-2 is requested to operate as a proxy OF switch by the OF switch 10-1. In this case, the "request source information: OF switch 10-1" is stored in the proxy information storage section 13 of the OF switch 10-2.

The proxy information is, for example, specified by the OF controller 20 and is stored in the proxy information storage 13 in advance. The request source information may be stored in advance in the proxy information storing section 13, or may be stored in the proxy information storage unit 13 at the time of establishing the connection.

The operation mode information storage unit 14 stores a fault flag and a proxy flag. When the OF switch 10 is operating normally (in this case, when the link between the OF switch 10 and the OF controller 20 is normal), the fault flag has the value "0". When a link failure between the OF switch 10 and the OF controller 20 has been detected, the value of the fault flag is updated to "1". The proxy flag indicates whether the OF switch 10 is operating as a proxy OF switch for another OF switch. For example, in the example illustrated in FIG. 4, the value of the fault flag of the OF switch 10-1 is updated to "1" and the value of the proxy flag of the OF switch 10-2 is updated to "1".

The message transceiver 15 transmits an OF message to the OF controller 20 and receives an OF message from the OF controller 20. However, when a link failure occurs between the OF switch 10 and the OF controller 20, the message transceiver 15 transmits the OF message to the proxy OF switch and receives the OF message from the proxy OF switch.

The message transceiver 15 includes a message processor 15a and a failure detector 15b. The message processor 15a can generate an OF message to be transmitted to the OF controller 20. For example, when the header information of a received packet does not meet the matching condition of the flow table 11, then the message processor 15a may generate an inquiry message. In addition, the message processor 15a processes an OF message received from the OF controller 20. For example, the message processor 15a may set up and/or update the flow table 11 according to the OF message received from the OF controller 20. The failure detector 15b monitors the state of the link between the OF switch 10 and the OF controller 20 by using the Echo request message and the Echo reply message described above.

The message forwarding unit 16 forwards a received message according to the forwarding information. The forwarding information, for example, is generated in response to the connection request received from another OF switch 10. Alternatively, when the request source OF switch of the connection request is determined in advance, the forwarding information may also be stored in the message forwarding unit 16 in advance. For example, the forwarding information given to the OF switch 10-2 illustrated in FIG. 4 is as follows.

(1) The OF message received from the OF switch 10-1 through the OF channel CH1a is forwarded to the OF controller 20 through the OF channel CH1b.

(2) The OF message received from the OF controller 20 through the OF channel CH1b is forwarded to the OF switch 10-1 through the OF channel CH1a.

The channel management unit 17 can establish an OF channel by establishing a connection with another OF switch 10. In addition, the channel management unit 17 can establish an OF channel by establishing a connection with the OF controller 20. Furthermore, the channel management unit 17 may update the forwarding information in the message forwarding unit 16 according to the established connection/ OF channel.

The packet processing unit 12, the message transceiver 15, the message forwarding unit 16, and the channel management unit 17 are implemented using a processor and a memory, for example. In this case, a portion of the packet processing unit 12, the message transceiver 15, the message forwarding unit 16, and the channel management unit 17 may be implemented by a hardware circuit.

Note that the OF controller 20 manages the state of each OF switch 10. For example, the OF controller 20 may manage the state of each OF switch 10 by using a switch management table illustrated in FIG. 6. In the switch management table, the proxy OF switch corresponding to each OF switch 10 is registered. For example, the OF switch 10-2 is registered as a proxy OF switch for the OF switch 10-1. In addition, the state of the link between each of the OF switches 10 and the controller 20 is stored in the switch management table. In the example illustrated in FIG. 6, a state in which a link failure has occurred between the OF switch 10-1 and the OF controller 20 is represented.

Figure 7A:
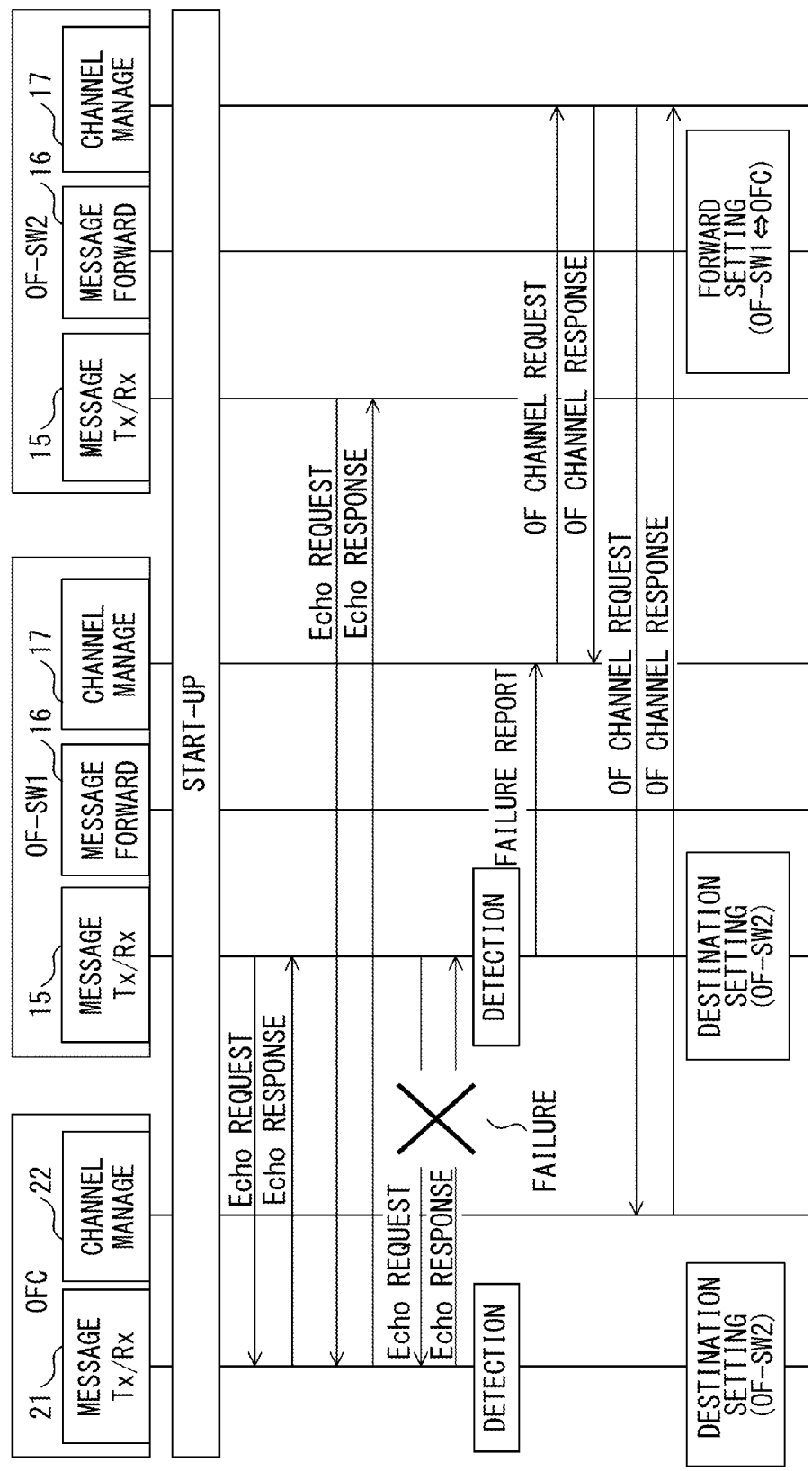
FIGS. 7A and 7B are sequence diagrams illustrating an example of a recovery procedure.
Figure 7B:
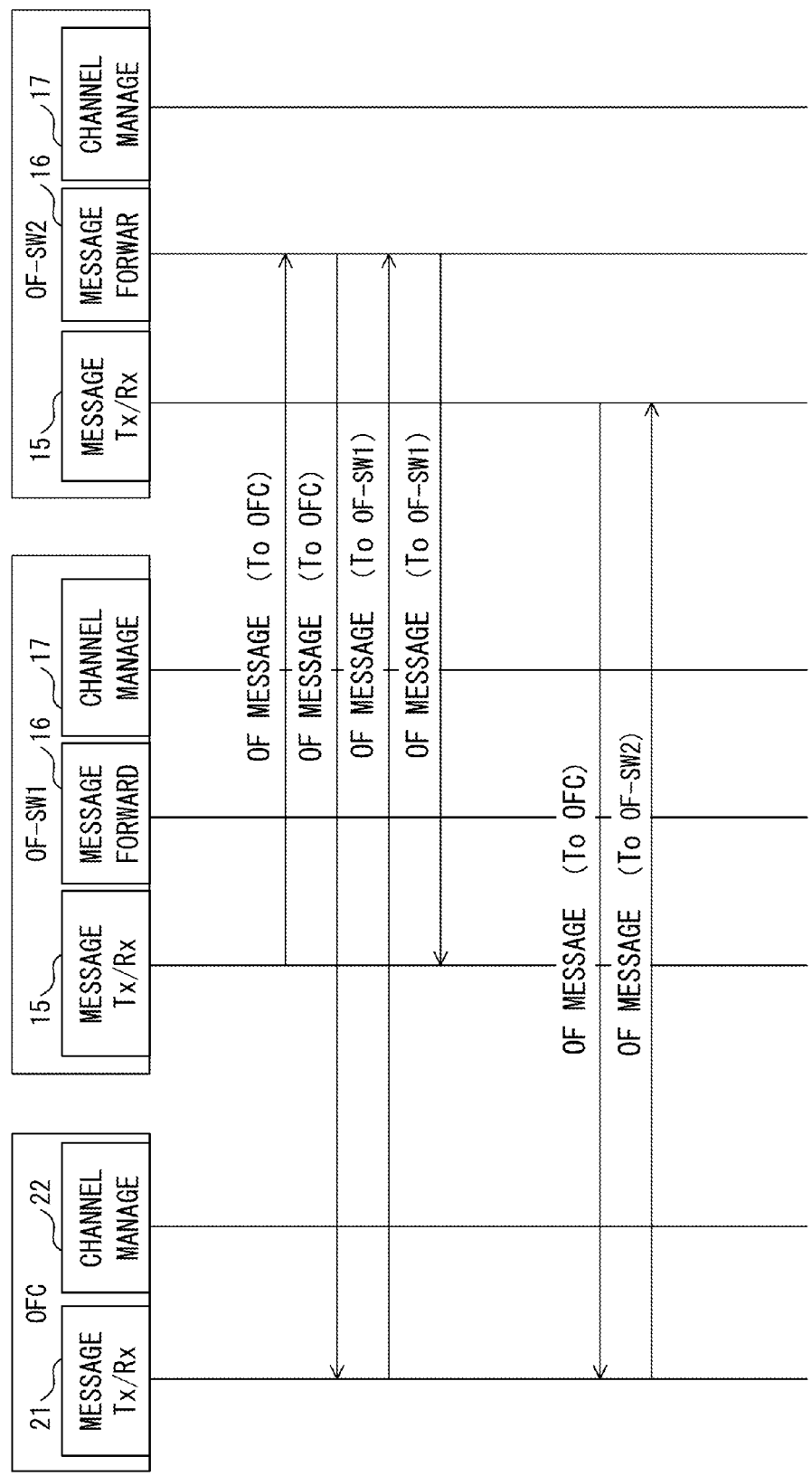

FIGS. 7A and 7B are sequence diagrams illustrating an example of a failure recovery procedure in the first embodiment. Note that the initial start-up, as described with reference to FIG. 3, is executed between each OF switch 10 and the OF controller 20. In other words, the connection establishment process, the handshake process, and the flow table setup process are executed between each OF switch 10 and the OF controller 20.

After the completion of the initial start-up, the life-or-death monitoring is executed between the OF controller 20 and each OF switch 10. That is, the Echo request/Echo reply is transmitted between the OF controller 20 and each OF switch 10. In this embodiment, a failure occurs on a link between the OF controller 20 and the OF switch 10-1. In this case, the message transceiver 21 of the OF controller 20 and the message transceiver 15 OF switch 10-1 respectively detect the link failure.

In the OF switch 10-1, the message transceiver 15 notifies the channel management unit 17 of the occurrence of the link failure. The channel management unit 17 refers to proxy information stored in the proxy information storage 13 and specifies an OF switch function as a proxy OF switch. In this example, the OF switch 10-2 is designated as the proxy OF switch. In this case, the channel management unit 17 of the OF switch 10-1 transmits a connection request to the OF switch 10-2. This connection request is received by the channel management unit 17 of the OF switch 10-2. Thus, the OF switch 10-1 operates as a requesting OpenFlow switch for the OF switch 10-2.

Upon receiving the connection request, the channel management unit 17 of the OF switch 10-2 returns a connection response to the OF switch 10-1. By so doing, a new connection/OF switch is established between the OF switch 10-1 and the OF switch 10-2. In the example illustrated in FIG. 4, the OF channel CH1a is established.

Then, the channel management unit 17 of the OF switch 10-2 transmits a connection request to the OF controller 20. This connection request is received by the channel management unit 22 of the OF controller 20. The channel management unit 22 returns a connection response to the OF switch 10-2. By so doing, a new connection/OF channel is established between the OF switch 10-2 and the OF controller 20. In the example illustrated in FIG. 4, the OF channel CH1b is established.

The OF controller 20 has detected the link failure between the OF controller 20 and the OF switch 10-1. Here, it is registered in the OF controller 20 that the proxy OF switch of the OF switch 10-1 is the OF switch 10-2. Thus, the OF controller 20 predicts that a connection request caused by the link failure is to be transmitted from the OF switch 10-2. Therefore, when the connection request is received from the OF switch 10-2, the OF controller 20 allows the request and returns the connection response to the OF switch 10-2. On the other hand, when a connection request is received from an OF switch 10 other than the OF switch 10-2, the OF controller 20 rejects the request. Hence, an OF channel through an unpredicted proxy OF switch is not established, and thus the security of the OpenFlow network 100 is secured.

In this way, if a link failure occurs, OF channels are established between the OF switch 10-1 and the OF switch 10-2, which has been designated as a proxy switch, and between the OF switch 10-2 and the OF controller 20, respectively. At this time, the following settings are provided in the OF switch 10-1, the OF switch 10-2, and the OF controller 20.

In the OF switch 10-1, the fault flag is updated from "0" to "1". When the fault flag is set to "1", the message transceiver 15 transmits a generated OF message not to the OF controller 20 but to a proxy OF switch (i.e., the OF switch 10-2). That is, a destination of the OF message is changed from the OF controller 20 to the OF switch 10-2.

In the OF switch 10-2, forwarding information stored in the message forwarding unit 16 is updated as described above. Further, the proxy flag is updated from "0" to "1". When the proxy flag is set to "1", the OF switch 10-2 forwards the received OF message to an address designated by the forwarding information.

In the OF controller 20, the switch management table illustrated in FIG. 6 is updated. More specifically, the state of the OF switch 10-1 is updated to "1: failure". Then, the message transceiver 21 transmits an OF message for the OF switch 10-1 not to the OF switch 10-1 but to a proxy OF switch (i.e., the OF switch 10-2). That is, a destination of the OF message is changed from the OF switch 10-1 to the OF switch 10-2.

After that, in the OpenFlow network 100, the OF message is transmitted as follows.

When the OF switch 10-1 transmits the OF message to the OF controller 20, the OF switch 10-1 refers to the fault flag. At this time, the fault flag of the OF switch 10-1 has been set to "1". In this case, the message transceiver 15 of the OF switch 10-1 transmits the generated OF message not to the OF controller 20 but to a proxy OF switch (i.e., the OF switch 10-2). That is, the OF switch 10-1 transmits the OF message to the OF switch 10-2 through the OF channel CH1a illustrated in FIG. 4.

When the OF switch 10-2 receives the OF message from the OF switch 10-1 through the OF channel CH1a, the OF switch 10-2 refers to the proxy flag. At this time, the fault flag of the OF switch 10-2 has been set to "1". In this case, the message forwarding unit 16 of the OF switch 10-2 forwards the received message to the OF controller 20 through the OF channel CH1b.

When the OF controller 20 transmits the OF message to the OF switch 10-1, the OF controller 20 refers to the switch management table illustrated in FIG. 6. At this time, the state of the OF switch 10-1 has been set to "1: failure". In this case, the message transceiver 21 of the OF controller 20 transmits the generated message not to the OF switch 10-1 but to a proxy switch (i.e., the OF switch 10-2). That is, the OF controller 20 transmits the OF message to the OF switch 10-2 through the OF channel CH1b illustrated in FIG. 4.

When the OF switch 10-2 receives the OF message from the OF controller 20 through the OF channel CH1b, the OF switch 10-2 refers to the proxy flag. At this time, the proxy flag of the OF switch 10-2 has been set to "1". In this case, the message forwarding unit 16 of the OF switch 10-2 forwards the received message to the OF switch 10-1 through the OF channel CH1a based on the forwarding information.

The message transmission between the OF switch 10-2 and the OF controller 20 is executed not through a proxy switch. That is, the OF switch 10-2 transmits the generated OF message to the OF controller 20 through an OF channel CH2. Further, the OF controller 20 transmits the generated OF message to the OF switch 10-2 through the OF channel CH2.

Note that the OF switch 10 that has detected a link failure may transmit the connection request and the proxy request to an arbitrary OF switch 10. In this case, the OF switch 10 that received the proxy request may transmit information identifying a request source of the proxy request to the OF controller 20. According to this configuration, it is not necessary to store the request source information in each OF switch 10. Further, it is not necessary for the OF controller 20 to manage the proxy OF switch of each OF switch 10.

Figure 8:
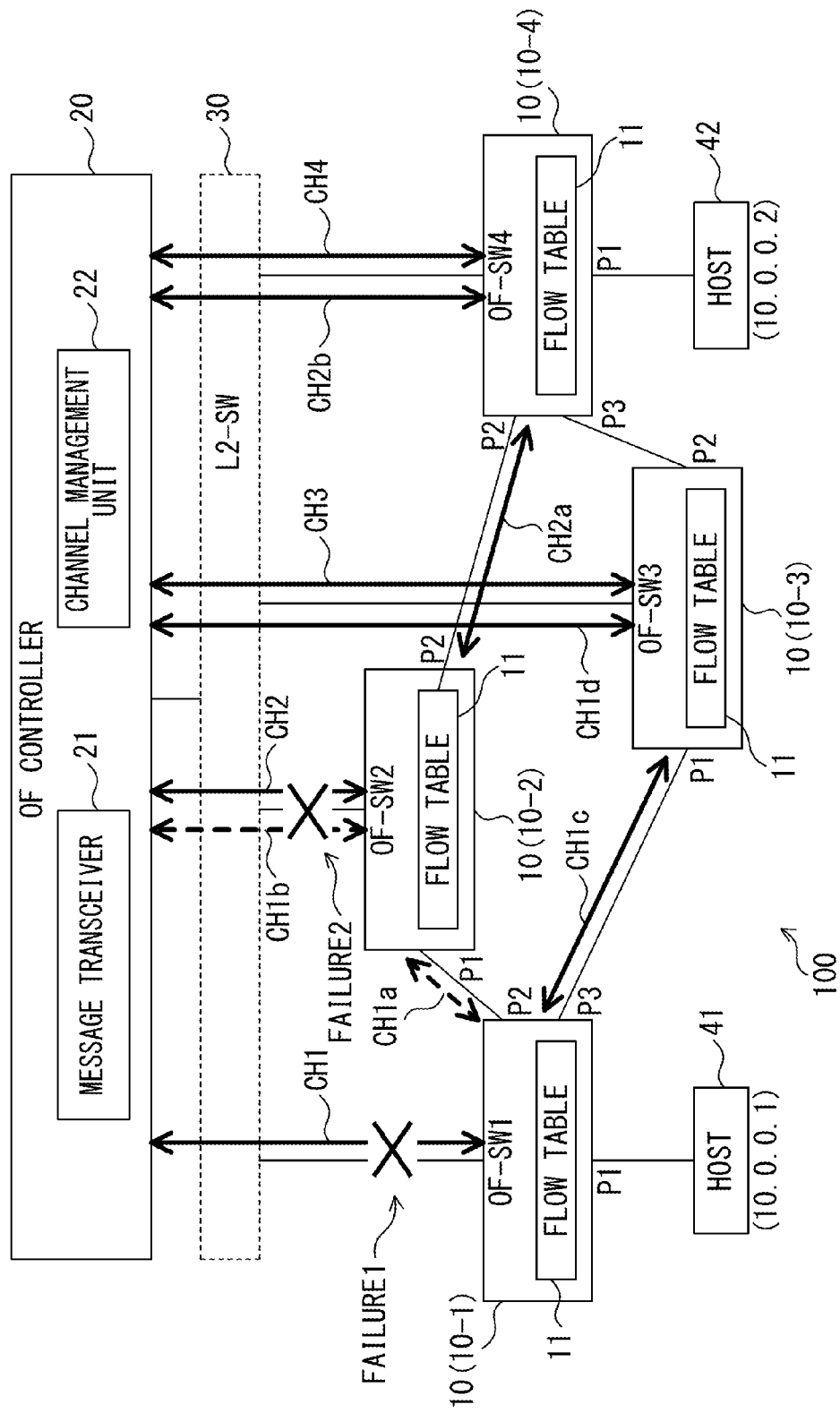
FIG. 8 illustrates an example of a recovery procedure for multiple failures.

FIG. 8 illustrates an example of recovery procedure for multiple failures. In this example, it is assumed that a failure 1 has occurred on a link between the OF switch 10-1 and the OF controller 20. In this case, similar to the example illustrated in FIG. 4, the OF switch 10-1 establishes an OF channel for transmitting an OF message between the OF switch 10-1 and the OF controller 20 through the OF switch 10-2. That is, when the failure 1 occurs, the OF channel CH1a is set up between the OF switch 10-1 and the OF switch 10-2, and the OF channel CH1b is set up between the OF switch 10-2 and the OF controller 20.

A failure 2 subsequently occurs on a link between the OF switch 10-2 and the OF controller 20. At this time, the OF channel CH1b has been established for the OF switch 10-1 and the OF channel CH2 has been established for the OF switch 10-2 on the failed link. Hence, the OpenFlow network 100 relieves the OF switch 10-1 and the OF switch 10-2.

In the example illustrated in FIG. 8, in order to relieve the OF switch 10-1, an OF channel CH1c is established between the OF switch 10-1 and the OF switch 10-3 and an OF channel CH1d is established between the OF switch 10-3 and the OF controller 20. A method of establishing the OF channels CH1c and CH1d is substantially the same as the method of establishing the OF channels CH1a and CH1b. Note, however, that a plurality of proxy OF switch candidates are preferably designated to recover the multiple failures. For example, the OF switch 10-2 is designated as the first proxy candidate and the OF switch 10-3 is designated as the second proxy candidate for the OF switch 10-1.

In order to relieve the OF switch 10-2, the OF channel CH2a is established between the OF switch 10-2 and the OF switch 10-4 and the channel CH2b is established between the OF switch 10-4 and the OF controller 20. A method of establishing the OF channels CH2a and CH2b is substantially the same as the method of establishing the OF channels CH1a and CH1b.

In this way, in the OpenFlow network 100, even if a failure occurs on the link used for the recovery of the failed link, the OF switch in relation to the failure can be connected to the OF controller by selecting further other OF switch. Thus, even if multiple failures occur on a link where an OF channel has been established, the risk of a state in which the OF switch 10 cannot be connected to the OF controller 20 is low.

Note that in a network (hereinafter referred to as the duplex network) in which links between OF controllers and each OF switch are duplex, respectively, an OF channel is set up on a protection link if a failure occurs in a work link. In the duplex network with this configuration, however, if a failure occurs on both of the work link and the protection link, the OF switch cannot be connected to the OF controller. Thus, in comparison with the duplex network, the failure recovery method of the embodiment of the present invention can reduce the number of physical links and improve a tolerance of multiple failures.

In the example described above, the OF switch 10 that has detected a failure uses an OF switch that is adjacent to the OF switch 10 itself as the proxy OF switch. The present invention, however, is not limited to this method. That is, the OF switch 10 that has detected a failure may use an OF switch that is not adjacent to the OF switch 10 itself as the proxy OF switch.

For example, in an example illustrated in FIG. 9, the OF switch 10-1 uses the OF switch 10-4 as a proxy OF switch. That is, the OF channel CH1x is established between the OF switch 10-1 and the OF switch 10-3, the OF channel CH1y is established between the OF switch 10-3 and the OF switch 10-4, and the OF channel CH1z is established between the OF switch 10-4 and the OF controller 20. In this case, forwarding information is updated in the OF switch 10-2 and the OF switch 10-3, respectively. Further, information of a path to a proxy OF switch in addition to an identifier of an OF switch operating as a proxy OF switch is stored in the information storage unit 13 of each OF switch 10.

In the example described above, a new OF channel for recovering a link failure is separately set up from an OF channel that has been established already. The present invention, however, is not limited to this method. That is, the OF channel for recovering a link failure is implemented by making use of the OF channel that has been established already.

Figure 10:
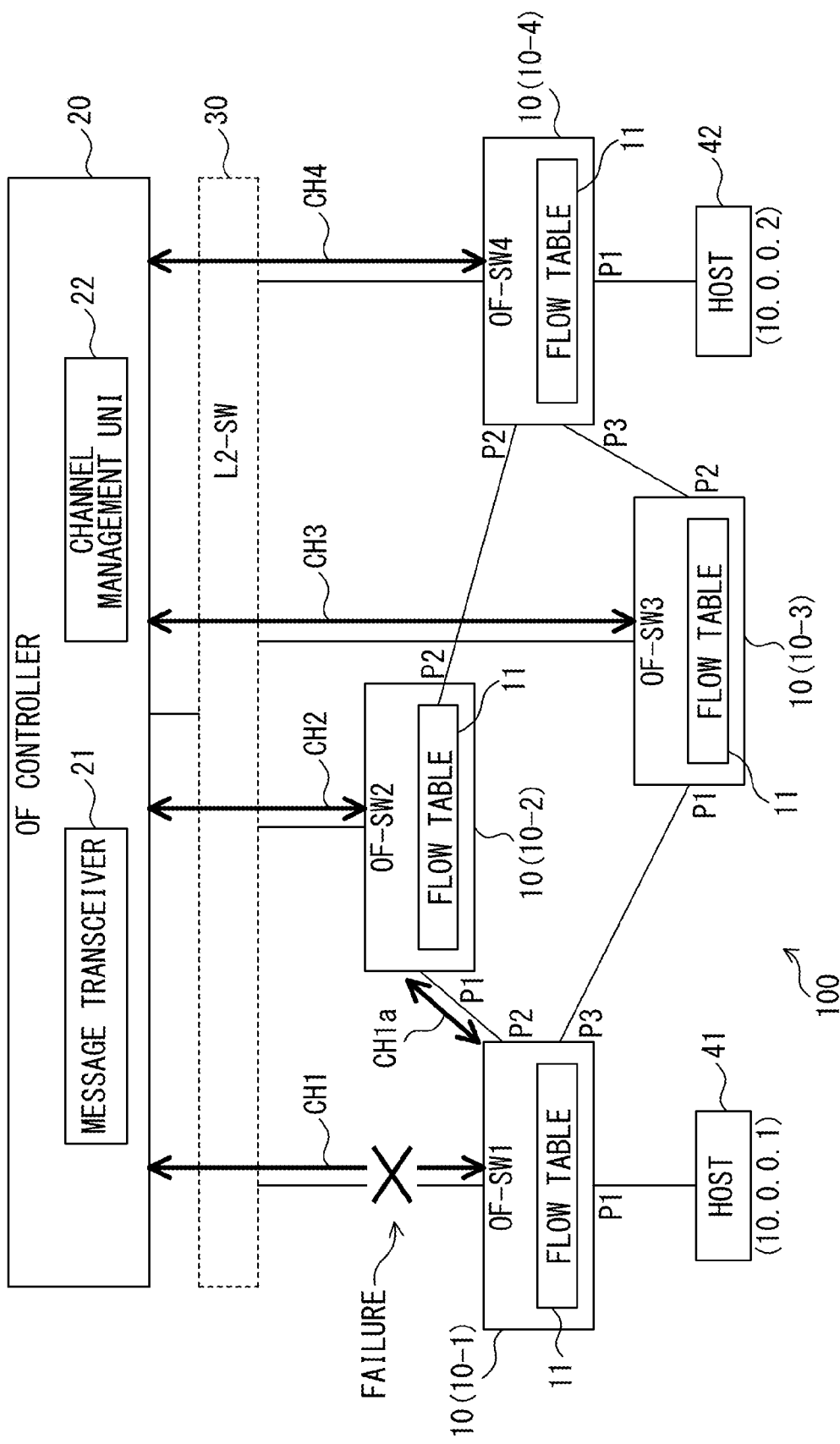
FIG. 10 illustrates another variation of the recovery procedure.

For example, in an example illustrated in FIG. 10, an OF message for the OF switch 10-1 is transmitted between the OF switch 10-1 and the OF switch 10-2 through the OF channel CH1a and transmitted between the OF switch 10-2 and the OF controller 20 through the OF channel CH2. That is, the OF channel CH2 transmits the OF message for the OF switch 10-1 and the OF message for the OF switch 10-2. In this way, the OF message for the OF switch 10-1 is transmitted through the OF channel CH2 that has been established in order to transmit the OF message for the OF switch 10-2.

In this case, it is assumed that the OF switch 10-2 can identify a packet that stores the OF message for the OF switch 10-1 and a packet that stores the OF message for the OF switch 10-2. Then, when the OF switch 10-2 receives through the OF channel CH2 the packet that stores the OF message for the OF switch 10-1, the OF switch 10-2 forwards the packet to the OF switch 10-1 through the OF channel CH1a. Further, when the OF switch 10-2 receives through the OF channel CH2 the packet that stores the OF message for the OF switch 10-2, the OF switch 10-2 terminates the packet.

Second Embodiment

In the first embodiment, when a link failure occurs between the OF controller 20 and the OF switch 10, an OF switch designated in advance operates as a proxy OF switch, so that the failure is recovered. In the second embodiment, an OF switch with a lower traffic amount is specified in the OpenFlow network 100 and the specified OF switch operates as a proxy OF switch.

Figure 11:
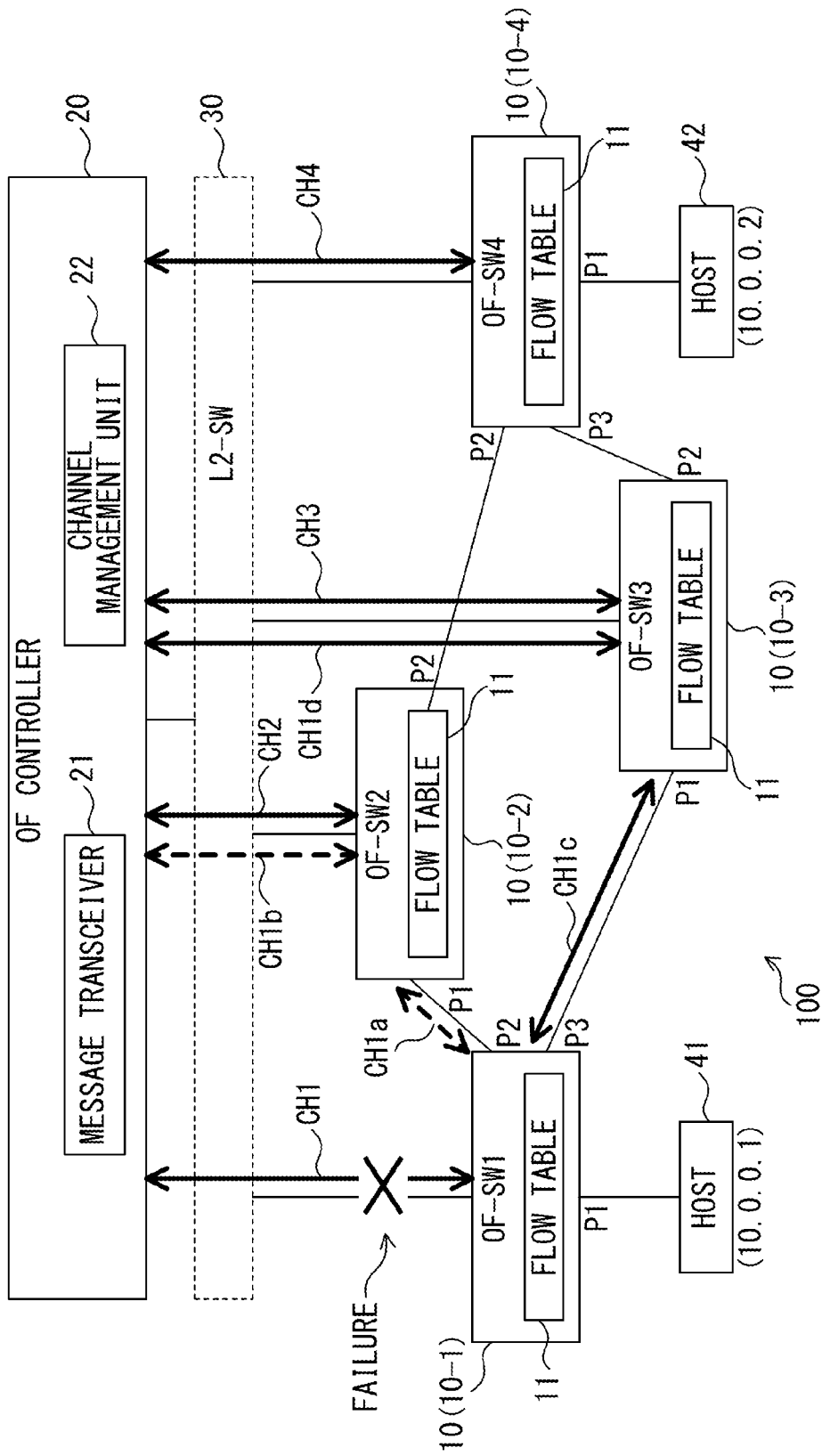
FIG. 11 illustrates an example of a recovery procedure in a second embodiment.

FIG. 11 illustrates a recovery procedure in the second embodiment. Here, it is assumed that a link failure has occurred between the OF controller 20 and the OF switch 10-1 and that the recovery procedures illustrated in FIG. 4 or FIG. 7A are performed. That is, the OF switch 10-2 has been designated as a proxy OF switch for the OF switch 10-1 and the OF channel CH1a and the OF channel CH2 have been established.

In the second embodiment, the OF controller 20 periodically checks traffic amount of each OF switch 10. Here the OF switch 10 monitors a traffic amount of each flow. As an example, the OF switch 10 counts the number of bits of passing packets for each flow. Then, the traffic amount data for each flow is stored in the flow table 11 as statistics.

FIG. 12 is a diagram explaining statistics of each OF switch 10. Here, the flow table 11 of the OF switch 10-2 through the OF switch 10-4 are exemplified. The statistics indicate the traffic amount for each flow. Further, the total traffic amount is calculated in each OF switch 10.

Hence, the OF controller 20 periodically collects statistics from each OF switch 10, and can confirm a traffic amount of each OF switch. Then, the OF controller 20 specifies an OF switch that has the lowest traffic amount. In the example illustrated in FIG. 12, the traffic amount of the OF switch 10-3 is the lowest among the OF switch 10-2 through the OF switch 10-4.

At present, a proxy OF switch for the OF switch 10-1 is the OF switch 10-2. However, the OF switch 10-2 operating as the proxy OF switch for the OF switch 10-1 does not have the lowest traffic amount in the OpenFlow network 100. In this case, the OF controller 20 changes the network configuration such that an OF switch with the least traffic amount in the OpenFlow network 100 is made to operate as a proxy OF switch. That is, the network configuration is changed so that the OF switch 10-3 will operate as a proxy OF switch for the OF switch 10-1.

In this case, the OF channel CH1a between the OF switch 10-1 and the OF switch 10-2 and the OF channel CH1b between the OF switch 10-2 and the OF controller 20 are released. Further, a new OF channel CH1c is established between the OF switch 10-1 and the OF switch 10-3 and a new OF channel CH1d is established between the OF switch 10-3 and the OF controller 20.

Figure 13A:
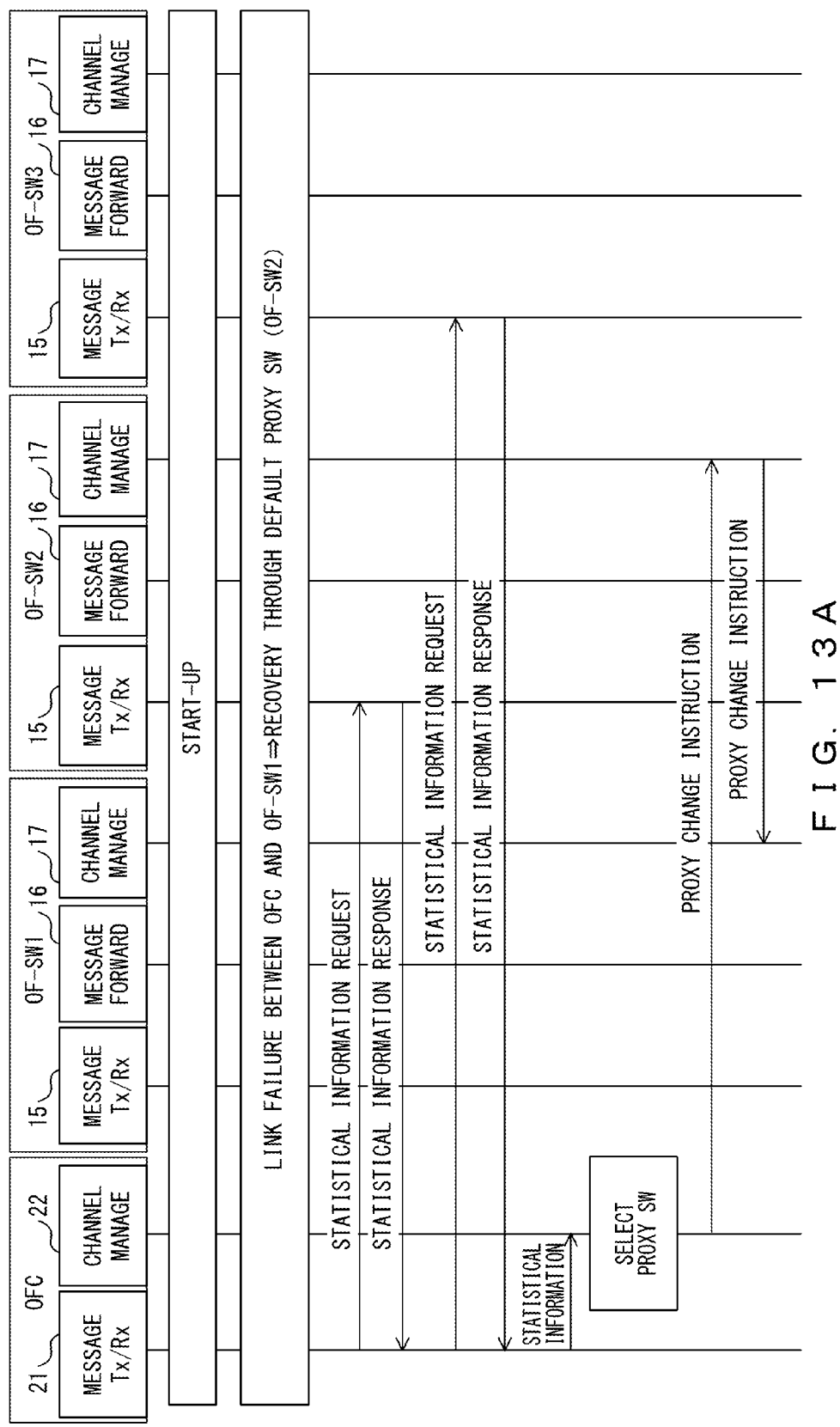
FIGS. 13A-13C are sequence diagrams illustrating an example of the recovery procedure of the second embodiment.
Figure 13B:
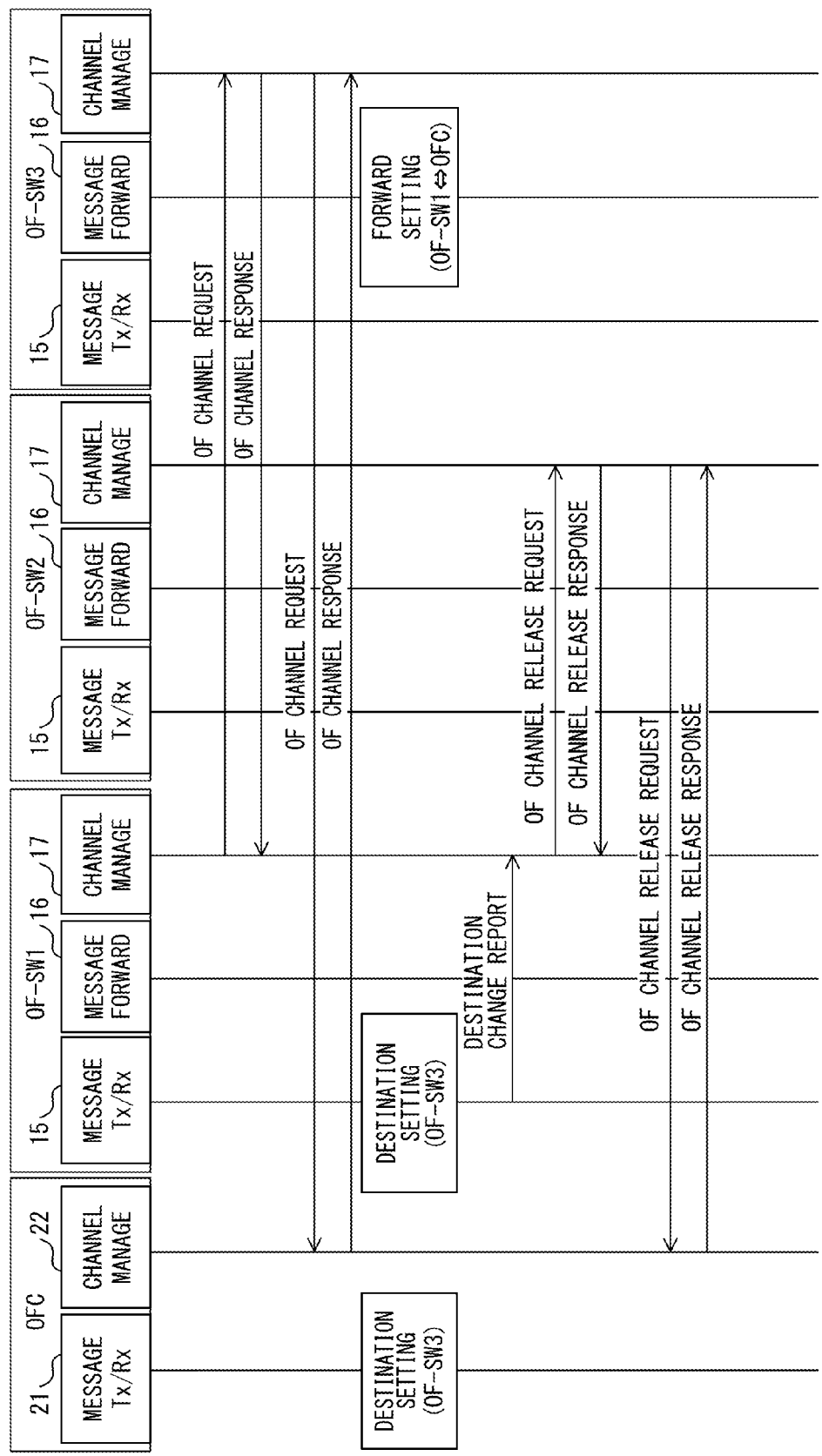
Figure 13C:
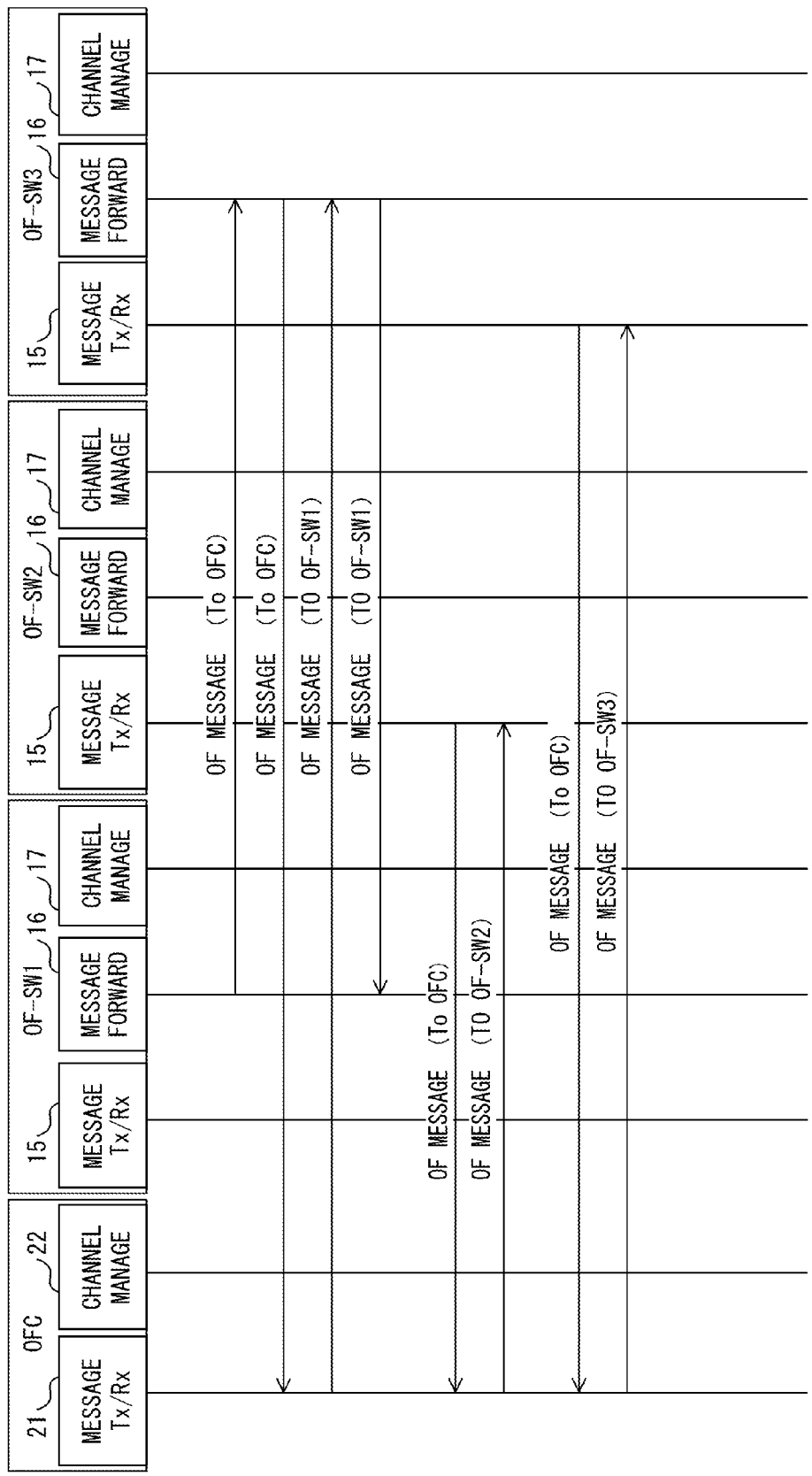

FIGS. 13A-13C are sequence diagrams illustrating an example of the recovery procedure of the second embodiment. Note that the initial start-up is executed between the OF controller 20 and each OF switch 10 as described with reference to FIG. 3. That is, the connection establishment process between the OF controller 20 and each OF switch, the handshake process and the flow table setup process are executed.

Further, it is assumed that, after the start-up, a link failure occurred between the OF switch 10-1 and the OF controller 20 and the link failure has been recovered through the sequence illustrated in FIG. 7A. That is, the OF channel CH1a has been set up between the OF switch 10-1 and the OF switch 10-2 and the OF channel CH1b has been set up between the OF switch 10-2 and the OF controller 20.

In the above-described network configuration, the OF controller 20 periodically requests each of the OF switches 10-1 through 10-4 to transmit statistical information. In FIG. 13A, however, only the requests for the OF switch 10-2 and the OF switch 10-3 are illustrated, for purposes of ease of viewing. Then, each of the OF switches 10-1 through 10-4 transmits statistical information to the OF controller 20. The statistical information in this example is the total traffic amount data stored in the flow table 11.

In the OF controller 20, the channel management unit 22 optimizes an OF switch operating as a proxy OF switch for the OF switch 10-1 based on the statistics collected from each of the OF switches 10-1 through 10-4. That is, the OF controller 20 specifies an OF switch with the least traffic amount based on the collected statistics. In this embodiment, the traffic amount of the OF switch 10-3 is the least. In this case, since the current proxy OF switch is not consistent with the OF switch with the least traffic amount, the OF controller 20 transmits a proxy change instruction to the OF switch 10-1. This proxy change instruction is transmitted to the OF switch 10-1 through the current proxy OF switch (i.e., the OF switch 10-2). Further, the proxy change instruction includes information to identify an OF switch (i.e., the OF switch 10-3) with the least traffic amount.

The channel management unit 17 of the OF switch 10-1 establishes an OF channel for transmitting an OF message to the OF controller 20 through the OF switch (i.e., the OF switch 10-3) designated by the proxy change instruction. This procedure is substantially the same as the processing operation for establishing an OF channel in the sequence illustrated in FIG. 7A. That is, an OF channel request is transmitted from the OF switch 10-1 to the OF switch 10-3 and an OF channel response is returned from the OF switch 10-3 to the OF switch 10-1. Further, an OF channel request is transmitted from the OF switch 10-3 to the OF controller 20 and an OF channel response is returned from the OF controller 20 to the OF switch 10-3.

Through this procedure, the OF channel CH1c and the OF channel CH1d that are illustrated in FIG. 11 are set up. Then, the message transceiver 15 of the OF switch 10-1 changes a destination of an OF message from the OF switch 10-2 to the OF switch 10-3. At this time, the message transceiver 15 may notify the channel management unit 17 of the change of the destination. Further, the message forwarding unit 16 of the OF switch 10-3 updates forwarding information as follows.

(1) An OF message received from the OF switch 10-1 through the OF channel CH1c is forwarded to the OF controller 20 through the OF channel CH1d.

(2) An OF message received from the OF controller 20 through the OF channel CH1d is forwarded to the OF switch 10-1 through the OF channel CH1c.

Further, the channel management unit 17 of the OF switch 10-1 releases an OF channel through a previous proxy OF switch. That is, an OF channel release request is transmitted from the OF switch 10-1 to the OF switch 10-2 and an OF channel release response is transmitted from the OF switch 10-2 to the OF switch 10-1. Further, an OF channel release request is transmitted from the OF switch 10-2 to the OF controller 20 and an OF channel release response is transmitted from the OF controller 20 to the OF switch 10-2. As a result, the OF channel CH1a and the OF channel CH1b are released.

Thereafter, the OF switch 10-1 transmits the OF message to the OF controller 20 through the OF switch 10-3. Also, the OF controller 20 transmits the OF message to the OF switch 10-1 through the OF switch 10-3.

In this way, according to the second embodiment, in order to recover a link failure between the OF controller 20 and the OF switch 10, an OF switch that has the smallest load in the OpenFlow network (or, a switch in which the most available resources are left) operates as a proxy switch. Thus, processing operation for the proxy switch does not deteriorate a forwarding performance between hosts.

Note that an OF switch with the least traffic amount is selected as a proxy OF switch in the above-described example, but the present invention is not limited this configuration. For example, if a traffic amount of a default OF switch designated in advance is less than a specified threshold, even in the case where there is an OF switch with a traffic amount that is less than the default OF switch, the change of the proxy switch is not required. Also, a parameter for the selection of a proxy OF switch is not limited to a traffic amount. That is, a proxy OF switch can be made in accordance with a resource amount available in each OF switch.

Other Embodiments

In the above-described embodiments, an OF message is transmitted between the OF switch 10 and the OF controller 20 with out-of-band scheme. The present invention, however, is not limited to this configuration. That is, an OF message may be transmitted between the OF switch 10 and the OF controller 20 with in-band scheme. However, when an OF message is transmitted with in-band scheme, a packet that stores the OF message is forwarded in accordance with the flow table 11. The flow table 11 of the OF switch 10 that operates as a proxy switch is updated to realize a newly set-up OF channel. For example, it is assumed in the embodiment illustrated in FIG. 4 that a virtual identifier "VID-SW1" is assigned to a flow for transmitting the OF message between the OF switch 10-1 and the OF controller 20 through the OF channels CH1a and CH1b. In this case, action information to forward the OF message between the OF switch 10-1 and the OF controller 20 for "a match condition: VID-SW1" is stored in the flow table 11 of the OF switch 10-2.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A failure recovery method used in an Open Flow network including a plurality of OpenFlow switches and an OpenFlow controller configured to control the plurality of OpenFlow switches, wherein
the OpenFlow controller has a memory in which a proxy OpenFlow switch for a first OpenFlow switch among the plurality of OpenFlow switches is registered, the proxy OpenFlow switch being one of the plurality of OpenFlow switches other than the first OpenFlow switch and wherein the failure recovery method comprises:
detecting, both in the first OpenFlow switch and the OpenFlow controller, a failure on a link between the first OpenFlow switch and the OpenFlow controller when a failure occurs on the link between the first OpenFlow switch and the OpenFlow controller;
transmitting a first request to establish an OpenFlow channel from the first OpenFlow switch to a second OpenFlow switch among the plurality of OpenFlow switches when the first OpenFlow switch detects the failure on the link between the first OpenFlow switch and the OpenFlow controller;
establishing a first OpenFlow channel between the first OpenFlow switch and the second OpenFlow switch in response to the first request;
transmitting a second request to establish an OpenFlow channel from the second OpenFlow switch to the OpenFlow controller when the second OpenFlow switch receives the first request from the first OpenFlow switch;
allowing the second request when the OpenFlow controller detects the failure on the link between the first OpenFlow switch and the OpenFlow controller and the second OpenFlow switch that has transmitted the second request is registered as the proxy OpenFlow switch for the first OpenFlow switch in the memory; and
establishing a second OpenFlow channel between the second OpenFlow switch and the OpenFlow controller when the second request is allowed.

2. The failure recovery method according to claim 1, further comprising:
configuring a forwarding circuit in the second OpenFlow switch so as to forward control information transmitted from the first OpenFlow switch through the first OpenFlow channel to the OpenFlow controller through the second OpenFlow channel and forward control information transmitted from the OpenFlow controller through the second OpenFlow channel to the first OpenFlow switch through the first OpenFlow channel.

3. The failure recovery method according to claim 1, wherein
the second OpenFlow channel is established on a connection established between the second OpenFlow switch and the OpenFlow controller in response to the second request.

4. The failure recovery method according to claim 1, wherein
the second OpenFlow channel is established on a connection that has been established in advance between the second OpenFlow switch and the OpenFlow controller.

5. The failure recovery method according to claim 1, wherein
the second OpenFlow switch is designated in advance for the first OpenFlow switch.

6. The failure recovery method according to claim 5, wherein
a path between the first OpenFlow switch and the second OpenFlow switch is designated in advance for the first OpenFlow switch.

7. The failure recovery method according to claim 1, wherein
the first OpenFlow switch adds an identifier to identify communication between the first OpenFlow switch and the OpenFlow controller to the control information and transmits the control information through the first OpenFlow channel, and
the OpenFlow controller adds the identifier to the control information and transmits the control information through the second OpenFlow channel.

8. The failure recovery method according to claim 1, wherein
the OpenFlow controller collects statistical information that represents traffic amount of each OpenFlow switch,
the OpenFlow controller specifies an OpenFlow switch with the least traffic amount based on the statistical information,
the OpenFlow controller transmits an instruction to notifies the first OpenFlow switch of the specified OpenFlow switch, and
the first OpenFlow switch transmits to the OpenFlow switch specified by the OpenFlow controller a request to establish an OpenFlow channel between the first OpenFlow switch and the OpenFlow controller.

9. The failure recovery method according to claim 1, further comprising:
collecting statistical information that represents a load of each OpenFlow switch, and
determining the second OpenFlow switch in accordance with the statistical information.

* * * * *